Dec. 15, 1953  T. L. FAWICK  2,662,785
ROTARY FLUID SEAL
Filed July 8, 1950  2 Sheets-Sheet 1
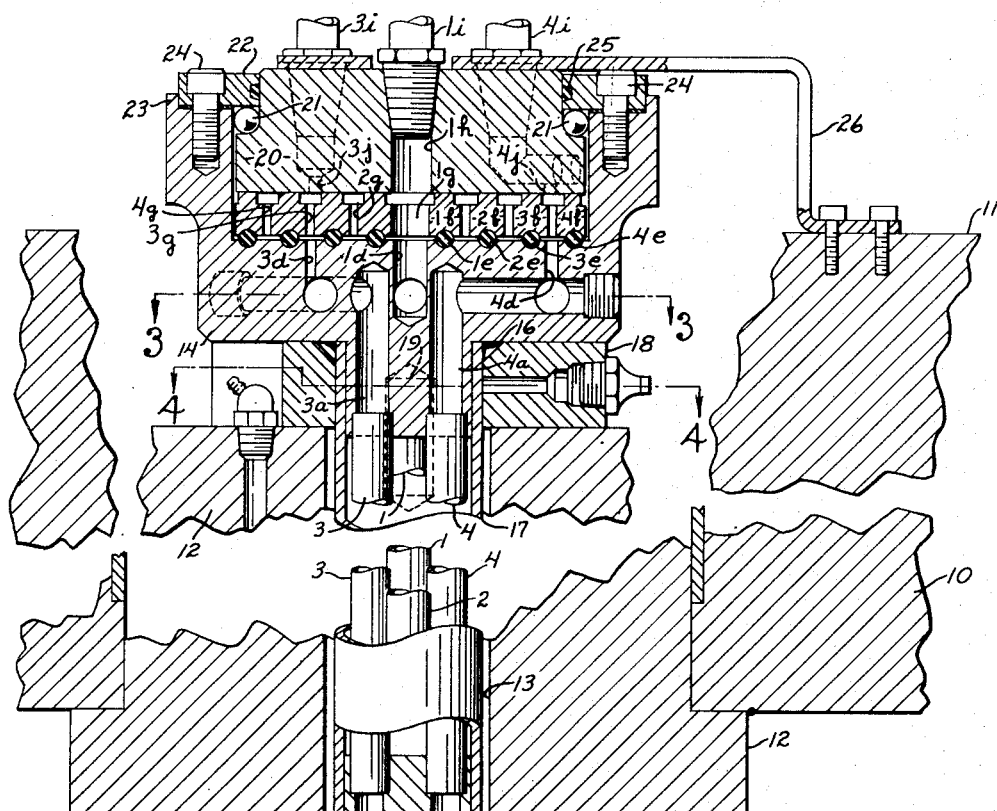
FIG. 1
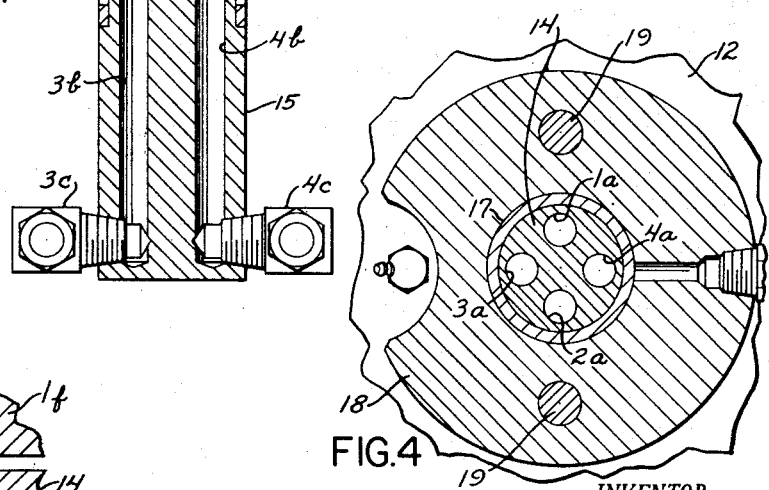
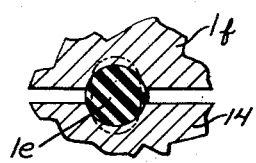
FIG. 5
FIG. 4
INVENTOR.
THOMAS L. FAWICK
BY *Willard D. Eakin*
ATTORNEY Dec. 15, 1953     T. L. FAWICK     2,662,785
ROTARY FLUID SEAL
Filed July 8, 1950     2 Sheets-Sheet 2
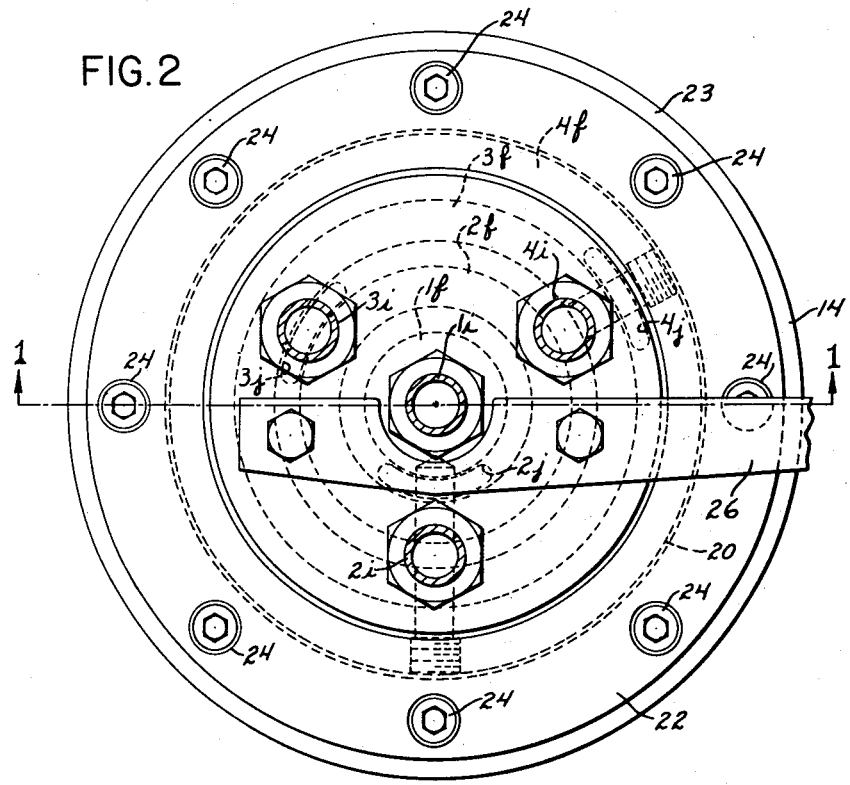
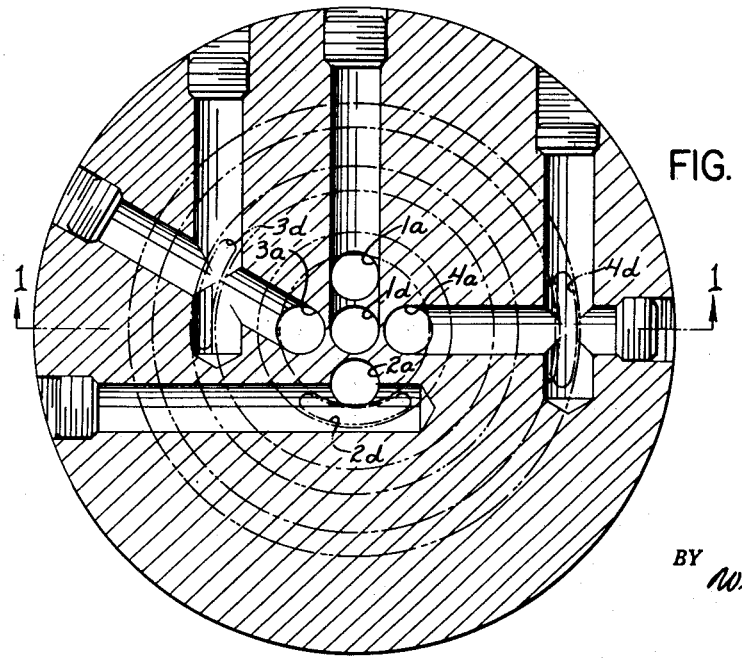
INVENTOR.
THOMAS L. FAWICK
BY Willard D. Eakin
ATTORNEY Patented Dec. 15, 1953

2,662,785

UNITED STATES PATENT OFFICE 2,662,785

ROTARY FLUID SEAL

Thomas L. Fawick, Cleveland, Ohio, assignor, by mesne assignments, to Federal Fawick Corporation, a corporation of Michigan Application July 8, 1950, Serial No. 172,687

3 Claims. (Cl. 285—9)

This invention relates to a rotary seal, for maintaining sealed communication between a fluid passage or a plurality of fluid passages in a member and a fluid passage or respective fluid passages in another member while one of the members rotates in relation to the other.

The example chosen for illustration in the accompanying drawings is adapted for use in an excavator of the shovel, clam-shell or other type. In such an assembly the rotary seal is provided to enable the operator in the cab to supply compressed air, from a source of supply on the cab assembly, selectively to a plurality of fluid actuated devices, such as clutches and brakes, mounted upon the chassis frame, while permitting the cab frame to turn, in accordance with the usual practice, upon the chassis frame.

My chief objects are compactness, simplicity, durability, dependability, and economy and facility of assembly, disassembly and repair.

Further objects are to provide, in a multiple-passage rotary seal, a high degree of symmetry of parts and elements; to provide uniformity of sealing pressure per unit of length of slip-seal members sealing the several passages, even though the said members be of different lengths, as in the case of a plurality of concentric rings defining a plurality of concentric annular flow passages; to provide an improved seal adapted to function with regard to fluid flowing in either direction through it, as in the case of both charging and venting fluid-actuated devices through the seal; and to provide these advantages permissibly without the use of springs.

Of the accompanying drawings;

Fig. 1 is a vertical middle section of a seal embodying my invention in its preferred form for a four-passage seal, with a diagrammatic showing of adjacent parts of an excavator in which the seal is incorporated.

Fig. 2 is a top view of parts shown in Fig. 1.

Fig. 3 is a section on line 3—3 of Fig. 1.

Fig. 4 is a section on line 4—4 of Fig. 1.

Fig. 5 is a fragmentary section showing a desirable form of gasket ring and grooves in which it is mounted.

Referring to the drawings, 10 is the chassis frame of an excavator and 11 is the cab frame rotatably mounted thereon in the usual manner, with the usual gearing and supporting rollers, not shown, interposed between the two.

A large king-pin 12, permissibly rigid with the chassis frame 10, centers the cab frame 11 and is centrally formed with a vertical through bore 13 through which loosely extends a fluid conducting structure comprising pipes 1, 2, 3 and 4 equally spaced about a common center and press-fitted at their upper ends in respective holes 1a to 4a in a casting 14, and at their lower ends in respective holes such as the holes 3b, 4b in a casting 15. The upper casting 14 has a stem which is press-fitted in and welded at 16 to the upper end of a tube 17 and the lower casting 15 has a stem press-fitted in the lower end of the tube 17. At the lower end of this fluid-conducting structure the fluid passages 1, 2, 3 and 4 are provided with suitable connections, such as those shown for passages 3 and 4 at 3c and 4c, for conducting fluid selectively to and from fluid-actuated devices not shown.

Between the cup-shaped casting 14 and the upper end face of the king-pin 12 is mounted a thrust-bearing ring 18 which is held against rotation with relation to the king-pin 12 by dowels 19, 19.

Upwardly the casting 14 is of cup-shape and by reason of suitable plugged cross-bores in the casting, as shown, the fluid passages 1a to 4a in the structure above described are in communication respectively with a central, fluid-receiving bore 1d in the floor face of the cup-shaped portion of the casting 14 and concentric, arcuate, fluid-receiving slots 2d, 3d, and 4d extending upwardly from the respective plugged bores to the floor face of the cup-shaped portion of the casting 14.

This floor face of the cup-shaped portion of the casting 14 is formed with concentric grooves in which are mounted respective sealing rings 1e to 4e, preferably of oil resistant synthetic rubber, the upper parts of which occupy corresponding grooves formed in the lower faces of a set of annular slip-seal members 1f to 4f, of carbon or other suitable slip-seal material.

These slip-seal rings 1f to 4f have their upper edge faces finished for slip-seal coaction with a plane-faced sealing member 20, having a hardened and ground lower face, which is accurately held, rotatably, in the cup-shaped part of the casting 14, with the deformable rings 1f to 4f under substantial compression, by radial-and-thrust bearing balls 21, 21 interposed between a raceway shoulder with which the member 20 is formed and a hold-down ring 22 which fits within a centering flange 23, on the casting 14, the hold-down ring 22 being secured upon the casting 14 by screws 24, 24. An oil retaining and dust excluding packing 25 is provided between the members 20 and 22.

The set of deformable rings 1e to 4e and the slip-seal members 1f to 4f by which they are embraced, define a central flow chamber 1g and concentric annular flow chambers 2g to 4g surrounding it, these four flow chambers being in communication respectively with the flow passages 1a to 4a in the above described structure, and thus with the pipes 1 to 4 extending downwardly through the king-pin 12.

The arcuate slots 2d to 4d, through which the annular flow chambers 2g to 4g have such communication, are of such length as to provide adequate flow capacity even though the slots are narrow radially for providing an assembly of small diameter.

The central flow chamber 1g is in communication with a through bore 1h in the member 20 and with a charging-and-venting pipe or hose 1i coupled thereto, and, through arcuate slots 2j to 4j in the lower face of the member 20, the flow chambers 2g to 4g are in communication respectively with charging and venting pipes or hoses 2i to 4i.

An arm 26 so connects the sealing member 20 with the cab 11 that the set of pipes or hoses 1i to 4i is compelled to rotate in its entirety with the cab frame and thus not be twisted.

In the operation of the seal, the hoses 1i to 4i selectively are connected at will, by manipulation of respective manually controlled valves (not shown), with a source of pressure fluid on the cab frame 11 and, on occasion, with the atmosphere.

Even though the cab frame 11 be rotated in relation to the chassis 10, fluid pressure in each of the flow passages 1 to 4 will be controlled in accordance with the fluid pressure in the corresponding one of the pipes 1i to 4i.

Preferably each of the slip-seal rings 1f to 4f is formed with annular shoulders as shown so that its sealing face against the member 20 will be desirably narrow, to assure a proper amount of sealing pressure per unit of its area contacting the member 20.

The shape and proportions of the deformable sealing rings 1e to 4e and adjacent parts are such that the rings are put under substantial compression in the assembling of the parts to provide, by their recoil, adequate sealing pressure between them and the members that they contact and between the slip-seal rings 1f to 4f and the finished lower face of the member 20, even though suction be applied to one or more of the annular chambers 1g to 4g, or different pressures concurrently applied to different ones of those chambers.

To provide adequate sealing pressures and yet have the rings 1e to 4e fit their preferably circular-section grooves when the rings are compressed, each ring may be given a somewhat elliptical cross-sectional form, with the long axis vertical, as shown clearly in Fig. 5.

The grooves preferably are of circular section so that the rings are well held against being wedged by fluid pressure into the space between plane adjacent faces of the members 20 and 14, as may occur when the deformable ring is opposed by a pair of rectilinear faces that are pronouncedly oblique all the way to the adjacent faces of the members 14 and 20.

All of the slip-seal rings 1f to 4f are of such cross-sectional shape and size that effective direct fluid pressures upon them are substantially balanced as to any effect upon their sealing pressures.

Preferably the slip-seal faces of the rings 1f to 4f are all of the same radial width, all of the deformable rings 1e to 4e are given the same percentage of vertical compression and each slip-seal ring 1f to 4f has the same medial circular length as its associated deformable ring. Then the slip-seal pressure per unit area will be the same at all parts of the slip-seal areas because the compressed deformable rings, although of successively greater circumferential lengths, will be exerting their pressures against slip-seal surfaces of proportionate lengths and consequently proportionate areas.

The arrangement as described is such that the set of deformable rings, 1e to 4e, sealed in their grooves in both the member 14 and the respective slip-seal rings 1f to 4f, serve to keep the latter in proper concentric relation.

The deformable rings 1e to 4e, by reason of the frictional grip of the members embracing them, prevent the slip-seal rings 1f to 4f from turning in relation to the member 14.

In the assembling of the parts the deformable rings 1e to 4e are simply laid in their respective grooves in the floor surface of the member 14, after which the slip-seal rings 1f to 4f are simply set upon their respective deformable rings, automatic centering of all of the rings thus being provided. Then the mounting of the member 20, balls 21 and hold-down ring 22, is easily performed. Disassembly also is easily performed by a reversal of the described operations.

A single plane face of the member 20 requires to be lapped to provide its several annular slip-seal areas. The slip-seal rings 1f to 4f are individually formed to the same height of slip-seal face but the resilience of the deformable rings 1e to 4e provides a substantial tolerance in the matter of accuracy of original dimensions and of dimensions after wear. The wear, however, is substantially uniform on all of the slip-seal surfaces, because of the above mentioned uniformity of the sealing pressure per unit of area of slip-seal surfaces.

Because of the circular-arc shape of the grooves in the members that embrace the deformable sealing rings the latter can have some self-energizing effect, under the force of differential fluid pressure, in addition to their initial compression, in sealing against the walls of the grooves, and in providing slip-seal pressure, whether the greater fluid pressure is against the inner periphery or against the outer periphery of the ring.

Modifications are possible within the scope of the invention as defined by the appended claims.

1. A rotary seal comprising two relatively rotatable members each formed with a fluid passage and means for maintaining sealed communication between the two passages, said means comprising a substantially rigid slip-seal ring having slip-seal face-to-face contact with one of the said members, on a slip-seal face transverse to the axis of rotation, in a single annular slip-seal zone surrounding the passage of that member at a substantial distance from said passage and having slip-seal contact with only that member, said slip-seal ring being formed with an annular groove in its face farthest axially from that member, the other one of said members having an annular groove surrounding its passage and facing the first said groove, and a static-seal ring of resiliently deformable material mounted under compression with a part of it in each of the pair of grooves and, by reason of its engagement with the walls of the grooves, constituting the only means for maintaining the centering and preventing rotation of itself and the slip-seal ring in relation to the one of the said members that does not have the recited slip-seal face.

2. A rotary seal as defined in claim 1 in which the recited grooves are of at least approximately circular-arc cross-sectional form and in which the deformable sealing ring, when in unstrained condition, is of approximately circular cross-sectional form but is of slightly greater dimension axially of the assembly than radially of the assembly, the assembly including bearing means for holding the two first recited members so spaced that the sealing ring is deformed to at least approximately circular cross-sectional form by being axially compressed by the walls of the grooves in which it is seated.

3. A rotary seal comprising two relatively rotatable members each formed with a plurality of fluid passages and means for maintaining sealed communication between fluid passages of one of the members with respective fluid passages of the other of said members, said means comprising a plurality of separate-individual, relatively movable, substantially rigid slip-seal rings having slip-seal face-to-face contact with one of the members, on slip-seal face areas transverse to the axis of rotation, each slip-seal ring being formed with an annular groove in its face farthest axially from the one of the said members with which it has slip-seal relation, the other of said members having an annular groove facing each of the said grooves, and a deformable static-seal ring mounted in each of the pairs of grooves, each slip-seal ring, as a ring, surrounding and maintaining sealed communication, through flow chambers, between a pair of the defined fluid passages in the said two relatively rotatable members, slip-seal rings of the set thus keeping each of the said flow chambers out of communication with the next, and at least one pair of the fluid passages in the said relatively rotatable members being in communication only through one of the said flow chambers between and defined by two of the slip-seal rings, the said static-seal rings, by reason of their engagement with the walls of their respective pairs of grooves, constituting at least the primary means for maintaining the said separate, individual slip-seal rings in centered relation and holding them against rotation in relation to the grooved one of the said relatively rotatable members.

THOMAS L. FAWICK.

References Cited in the file of this patent
UNITED STATES PATENTS

| Number | Name | Date |
|---|---|---|
| 872,358 | Liddell | Dec. 3, 1907 |
| 986,439 | Camp | Mar. 14, 1911 |
| 1,948,963 | Dukes | Feb. 27, 1934 |
| 2,200,151 | Burkhardt | May 7, 1940 |
| 2,404,494 | Halby et al. | July 23, 1946 |

FOREIGN PATENTS

| Number | Country | Date |
|---|---|---|
| 431,059 | France | Aug. 31, 1911 |

OTHER REFERENCES

American Machinist, August 2, 1945, pp. 122–123; "Sealing Point Free of Flash Eliminate Packing Ring Leakage," by Harry G. Wessel, Westinghouse Airbrake Co.